United States Patent [19]

Fisher et al.

[11] Patent Number: 5,588,209
[45] Date of Patent: Dec. 31, 1996

[54] METHOD AND APPARATUS TO MANUFACTURE STABILIZER BARS

[75] Inventors: Ian A. Fisher, Chesterfield; Philip Ferdani, Rugby, both of United Kingdom

[73] Assignee: The Tempered Spring Company Limited, England

[21] Appl. No.: 237,759

[22] Filed: May 4, 1994

[51] Int. Cl.⁶ .............................. B28B 5/00; B23P 17/00
[52] U.S. Cl. ..................... 29/897.2; 29/527.1; 264/251
[58] Field of Search ................. 29/527.1, 527.2, 29/527.3, 527.4, 897.2; 264/251

[56] References Cited

U.S. PATENT DOCUMENTS

| | | |
|---|---|---|
| 2,254,325 | 9/1941 | Slack et al. . |
| 2,275,637 | 3/1942 | McIntyre et al. . |
| 2,770,453 | 11/1956 | Cuskie . |
| 2,784,964 | 3/1957 | Linn . |
| 4,083,580 | 4/1978 | Shaner . |
| 4,097,057 | 6/1978 | Goodrich, Jr. et al. . |
| 4,570,969 | 2/1986 | Tsutsumi et al. . |
| 4,744,677 | 5/1988 | Tanaka et al. . |
| 4,806,405 | 2/1989 | Liebl ............... 264/251 |
| 4,826,145 | 5/1989 | Moore et al. . |
| 4,836,516 | 6/1989 | Wycech . |
| 4,976,417 | 12/1990 | Smith . |
| 5,041,253 | 8/1991 | Husted ............... 264/251 |
| 5,080,334 | 1/1992 | Mihara et al. . |

FOREIGN PATENT DOCUMENTS

| | | |
|---|---|---|
| 0341814 | 11/1989 | European Pat. Off. . |
| 2342425 | 9/1977 | France . |
| 2553041A | 4/1985 | France . |
| 2564043 | 11/1985 | France . |
| 0384799 | 8/1990 | France . |
| 2322785 | 11/1974 | Germany . |
| 60-252836A | 12/1985 | Japan . |
| 61-127933A | 6/1986 | Japan . |
| 650944 | 3/1951 | United Kingdom . |
| 2039258 | 8/1980 | United Kingdom . |
| WO91/09748 | 7/1991 | WIPO . |

OTHER PUBLICATIONS

"Les élastomères thermoplastiques"–Caoutchoucs & Plastiques, (1988) Mai, No. 678, Paris, France.

Primary Examiner—P. W. Echols
Attorney, Agent, or Firm—Nixon & Vanderhye P.C.

[57] ABSTRACT

Figure 2A:
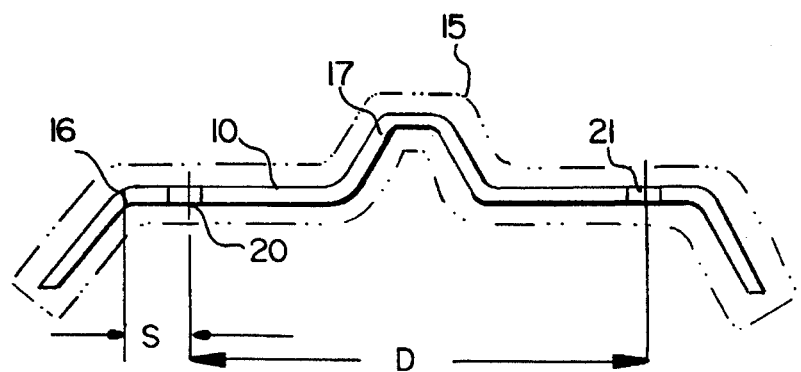
Figure 2B:
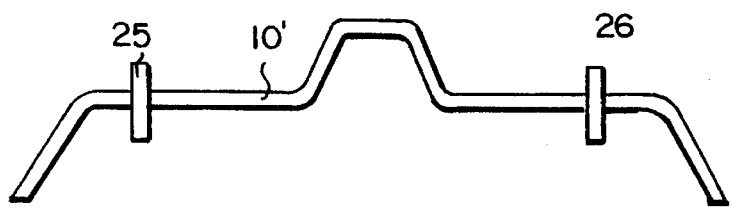

A method of manufacturing a vehicle sway bar 10' (FIG. 2(b)) which has two non-metallic components 25 and 26 molded directly thereonto at a spacing D for interfacing with a vehicle chassis, enabling the bar to be fabricated separately from, rather than during assembly with, the vehicle, comprises producing a bar form 10 from steel rod bent to shape, defining a datum point or feature of the bar beam by which the bar can be located with respect to a reference part 33 of molding apparatus 30, defining a first portion 20 of the bar, at which a first component 25, is to be molded, in terms of its distance S from the datum feature, arranging the molding apparatus 30 with two molds 31, 32 a distance D apart and the first mold a distance S from reference part 33, locating the bar form 10 with the datum feature at the reference part and extending through the molds and molding components onto the first and second portions of the bar form to give sway bar 10'.

14 Claims, 3 Drawing Sheets

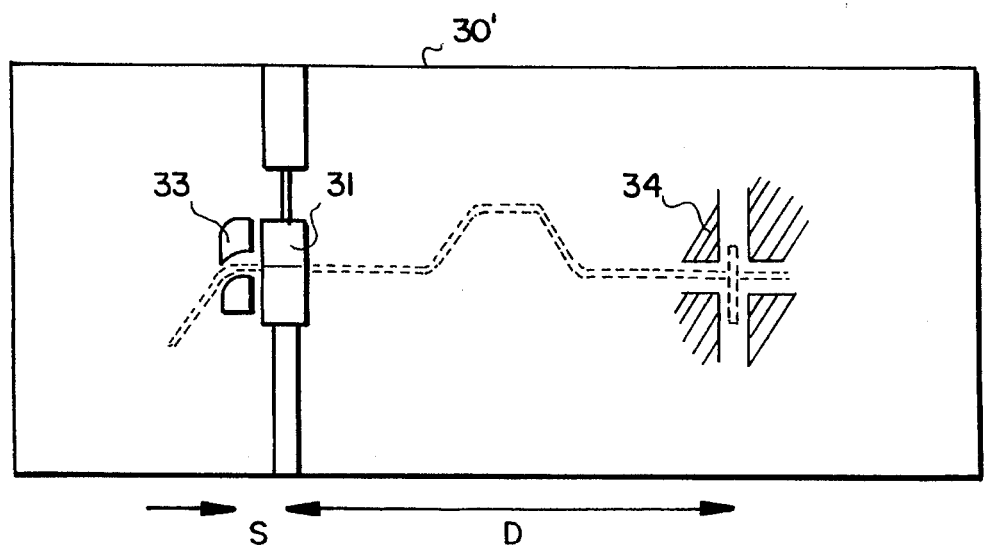
FIG. 3A
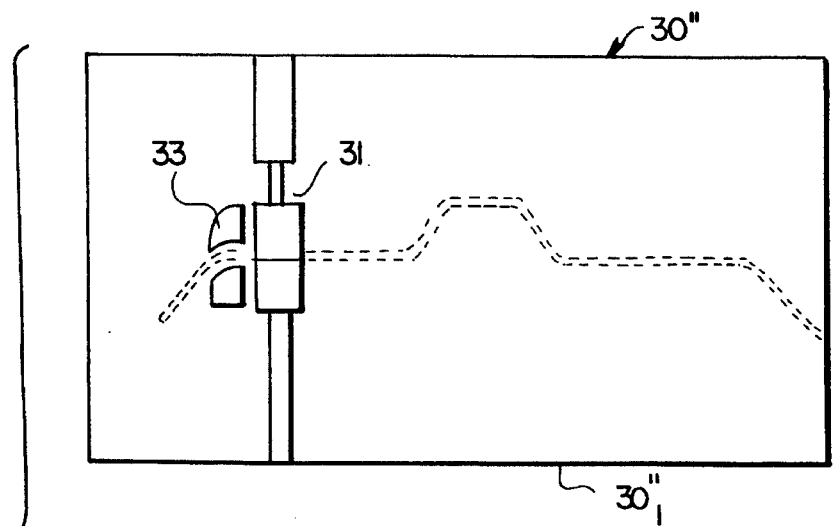
FIG. 3B
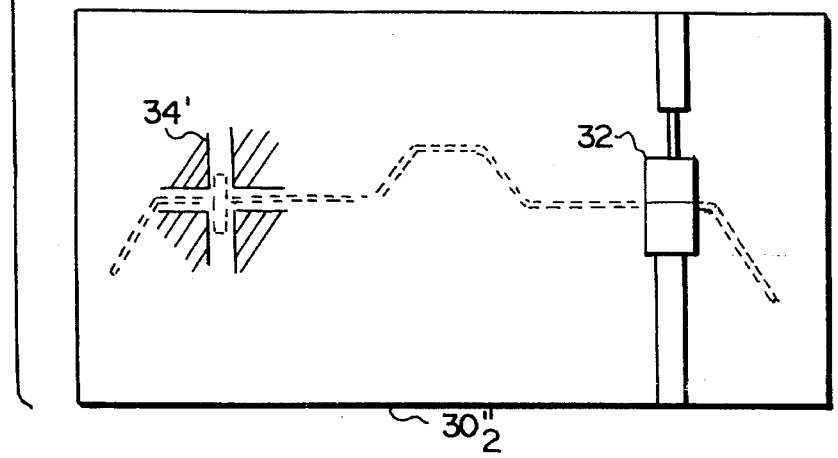

METHOD AND APPARATUS TO MANUFACTURE STABILIZER BARS

This invention relates to stabiliser bars of the type commonly termed sway bars or anti-roll bars used in automobile suspension systems. Such a bar is normally produced by hot or cold forming steel rod, by bending and otherwise, into a desired bar form which corresponds to a region of the underside of a vehicle, before being given a surface treatment such as shot peening to produce a stressed surface that improves torsional characteristics and coating with paint or like surface protection. The bar is then mounted with respect to the vehicle by way of non-metallic components which are disposed on the bar, and often clamped and/or glued to it, to mate up with locating and/or mounting points on the vehicle.

In general it is required to locate the bar with respect to accurately fixed points on the vehicle chassis, either for mounting the bar to the vehicle or for controlling relative motion between the bar and the vehicle, for example abutments for thrust collars to prevent lateral motion.

Such a formed bar may have a length from less than 4 feet to in excess of 6 feet and a series of bends at different positions along its length and in different directions and planes. Thus in terms of manufacture, it is not considered practicable to manufacture such an elongate three-dimensional object to a high degree of accuracy and it is typical for the specifications as to shape to be defined by an ANSI Standard drawing for specifying tolerances that require the bar, and individual features thereof, to fit within a three dimensional spatial envelope, individual features of the bar having a positional accuracy with respect to each other only within, say, 5 mm.

Whilst this is practicable in respect of forming a bar with sufficient accuracy to fit within the space allowed for the bar in the vehicle, this may not be true for the non-metallic components which interface between the bar and chassis and which have to have the same positional accuracy with respect to each other as the chassis points, typically within 1 mm.

Thus it has been traditional to dispose mounting components with respect to such a formed bar at the time of assembly on the vehicle, effectively mounting the component with respect to the vehicle and mounting the bar with respect to the component, securing it thereto by adhesives and/or radial clamping pressure depending upon the nature of the component.

However, such assembly techniques requiring its performance as part of the vehicle assembly operation is comparatively expensive in terms of the increase in vehicle production time and skilled labor it takes to effect. The non-metallic components are pre-formed also in a manner and from material which permits such disposition with respect to the bar, being of a resilient elastomer, traditionally rubber, that can be stretched to slide along the bar before being contracted onto the bar, or combinations of resilient materials within more rigid sleeves that are slit radially to pass around the bar.

In addition to limitations as to assembly technique and materials, it is also found that these limitations inhibit full use of components such as thrust collars which are required to withstand axial forces directed along the bar by way of a relatively large radially extensive surface whilst fitting within a short axial length of bar due to adjacent bodies. Such space restrictions may even make it impossible to effect manual location of the components during assembly of the bar with the vehicle.

The ability to simplify assembly of the bar to vehicle has been acknowledged as a desideratum and as part thereof, in accordance with such desideratum the manufacture of the bar with any such components secured to the bar at the required dispositions during such manufacture and before the bar is mounted on the vehicle; However, the interrelated factors regarding positioning and attachment of such components which have to be accommodated have precluded serious attempts.

Patent Specification EP-A-0384799 discusses the possibility of molding an individual component of rubber directly onto the bar, presumably so that some of the above outlined disadvantages in separate assembly can be eliminated. However, without going further than discussing the formation of a single component per se, it also mentions that it is believed advantageous instead to manufacture separately a split multi-layered bush and locate it on the bar and secure it thereto with adhesive. No teaching is therefore forthcoming as to mitigating the limitations as to materials, type of component to be formed or to difficulties inherent in providing at least two such components on a long, unweldy bar form to satisfy the relative positional accuracy required in respect of the several components, if such components are not disposed during assembly of the vehicle.

It is an object of the present invention to provide a method of making a sway bar which eliminates at least some of the disadvantages associated with known sway bar designs and apparatus for manufacturing a sway bar by this method.

In accordance with the present invention a method of manufacturing a vehicle sway bar comprises forming a steel rod into the desired shape of bar, defining a datum point for the formed bar shape, enclosing each of a first portion of the bar, defined with respect to said datum point, and a second portion of the bar, spaced a predetermined distance along the bar from said first portion, in molding apparatus and molding onto the bar portions from rubber or plastics material caused to flow in molding a pair of suspension components.

Figure 1A:
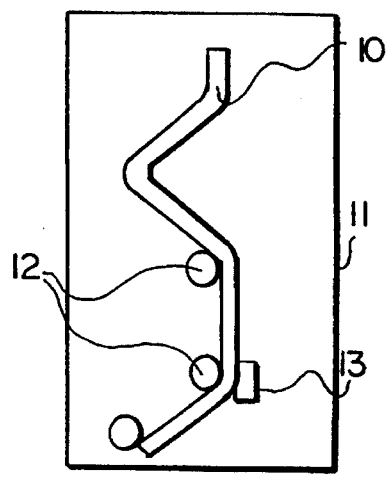
Figure 4:
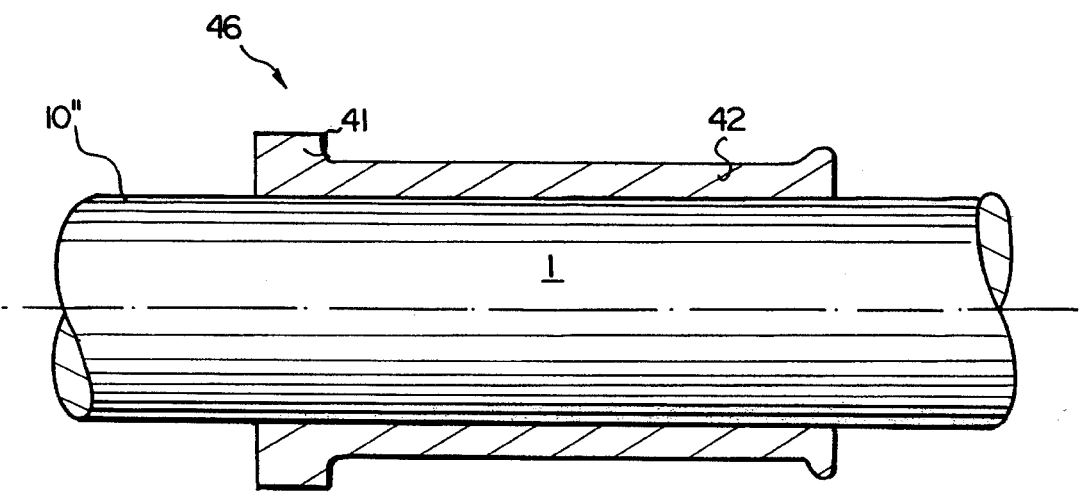

Embodiments of the invention will now be described by way of example with reference to the accompanying drawings, in which:

FIG. 1, through its component parts, is a schematic representation of apparatus for manufacturing a sway bar in accordance with the present invention, FIG. 1(*a*) thereof being a representation of bending apparatus for producing the bar form from steel rod, and FIG. 1(*b*) thereof being a representation of molding apparatus for molding non-metallic components directly onto the bar, FIG. 2(*a*) is a schematic representation of an ideal sway-bar form illustrating a typical spatial envelope in which each part of an actual bar formed has to fit, FIG. 2(*b*) is a similar representation but of a completed sway bar carrying components molded thereon at first and second portions in accordance with the invention, FIG. 3(*a*) is a schematic representation of a first alternative form of molding apparatus, FIG. 3 (*b*) is a schematic representation of a second alternative form of molding apparatus, and FIG. 4 is a sectional elevation through a sway bar in accordance with the invention and having a suspension component molded onto a formed bar.

Referring to FIGS. 1(*a*), 2(*a*) and 2(*b*), a vehicle sway bar form 10 is shaped from steel rod by bending apparatus 11 indicated schematically and well known in the art per se; a simple bar form may be produced by supporting a cold or heated steel rod at a plurality of reaction points 12 and applying force intermediate those points by hydraulic jack means 13 so that a shaped planar bar is formed in one operation. Alternatively, and more typically, different sections of such a bar are bent to shape in separate, basically similar, operations with the bar being brought to the apparatus each time and the various section bends possibly being in different planes. In such event it will be appreciated that the accuracy with which the various bends are formed with respect to each other cannot be expected to be of high precision and as illustrated in FIG. 2(a), the bar specification usually calls for the bar to fit only within a spatial envelope 15 so that minor variations in the relative positions of, and angles between, bends have a reasonable manufacturing tolerance consistent with the space available for the bar to fit in relation to the vehicle chassis and suspension. It will be appreciated that such a spatial envelope is not constrained to a bar shape nominally within a single plane. Typically such a spatial envelope requires the positional accuracy of discrete features, such as bends 16, 17, to be within 5 mm.

As indicated above, it is necessary to locate the formed bar with respect to a vehicle by way of two or more non-metallic components disposed at spaced apart first and second portions of the bar, indicated at 20 and 21, and which, in order to mate with fixed points on the chassis, have to be defined with respect to each other with greater accuracy than features of the bar, say within 1 mm.

Each of said first and second portions 20 and 21 is of a finite length, depending upon the component, and for convenience the center of each portion is defined and identified as the portion.

As also indicated above, having achieved a desired bar form the bar is subjected to shot peening or the like physical treatment, to provide suitable compressive stresses at the surface which increase the torsional longevity of the bar, and then to cleaning and coating with a suitable surface protection.

In accordance with the method of this invention, non-metallic components 25 and 26 are molded directly onto the portions 20 and 21 respectively, as illustrated in FIG. 2(b), to form a component carrying sway bar 10' ready for assembly with the vehicle. The components have dimensions and shapes to suit a required purpose, being illustrated as axially thin thrust collars. To perform the method, a datum point for the formed bar shape is defined, say the feature of bend 16, said first portion 20 is defined with respect to this feature in terms of being separated therefrom by a predetermined spacing S and the second portion 21 is defined at a predetermined distance D from the first portion. Each of said first and second portions of the bar is enclosed in molding apparatus and molded onto the portions, from rubber or plastics material caused to flow in molding, are a pair of suspension components 25 and 26.

Figure 1B:
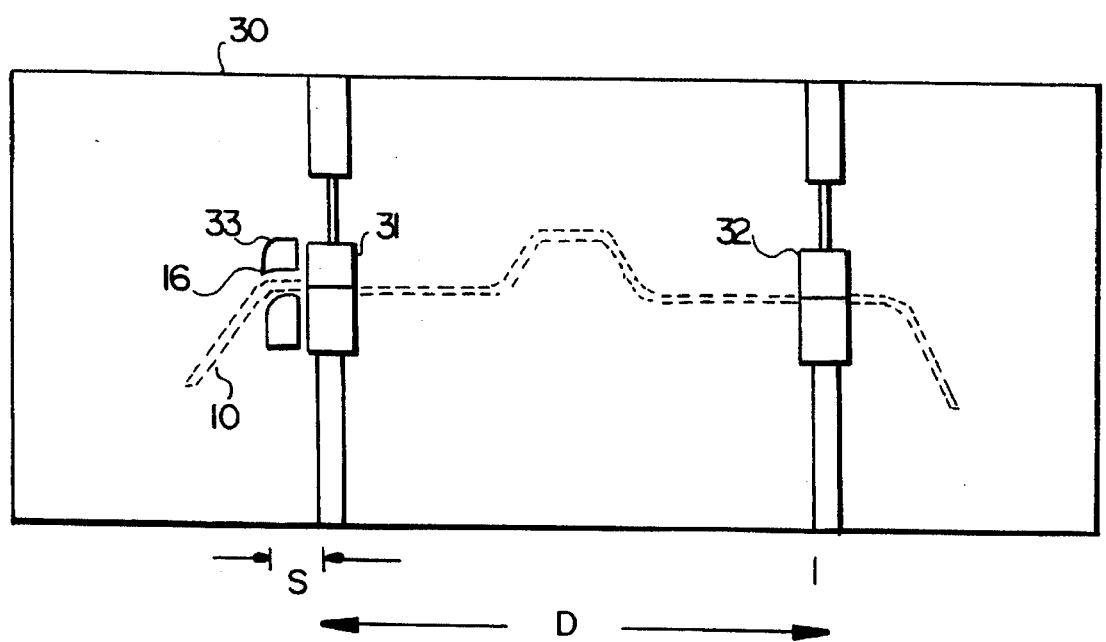

Referring to FIG. 1(b) which schematically shows molding apparatus 30, this apparatus comprises two molds 31, 32 which are apertured to receive the elongate bar extending therethrough and disposed with respect to each other at a distance D apart so as to enclose the bar portions 20 and 21 respectively. Each mold is part of an injection molding arrangement of conventional design including a suitably shaped and dimensioned molding cavity and whose operating parameters, dependant upon the material molded, are discussed in the Examples hereinafter.

Alternative types of molding arrangements, employing transfer or compression molding may be employed if appropriate. The molding apparatus also includes a first reference part 33 adapted to receive the datum feature 16 of the bar and separated from the center of mold 31 by the aforementioned spacing S.

The prepared bar form 10 is disposed with respect to the apparatus 30 as shown by locating the datum feature 16 at the first reference part such that the first and second portions are located in the respective molds, at each of which a component is molded directly onto the bar.

It will be appreciated that whereas the first reference part 33 of the apparatus serves to locate the first portion 20 at a predetermined spacing therefrom in the mold 31, the component 25 formed at the first portion in mold 31 serves as a datum feature for the component 26 at the second portion 21. The molds may be operated simultaneously, in which case such relationship is of academic interest only, but may also be operated sequentially and in tandem, relying upon the mold 31 to form a second reference part with which to locate the first component said distance D from the second portion in the other mold.

As discussed above, the specification by which the bar form is defined permits the portions 20 and 21 to be other than in axial alignment, particularly if there is an intervening bend as shown, and as a result it may be inconvenient or impracticable to enclose both first and second portions 20 and 21 in rigidly mounted molds 31 and 32 together, unless clamping means is employed to ensure the two bar regions at the first and second portions are coaxial or the molds are able to vary their relative positions while maintaining said predetermined distance D.

Alternatively, and illustrated schematically in FIG. 3(a) for molding apparatus 30' said second reference part may be defined by mechanical abutments 34 spaced said distance D from the mold 31 in the same apparatus, in which case mold 32 is not required. After the first component has been molded in mold 31, the bar is displaced so that this first component is disposed at the second reference part 34 and the second portion is enclosed by the mold 31 whereupon the second component is molded onto the, bar, but in positional relationship with the first component and not any other feature of the bar. Clearly additional components may be molded onto the bar at other similarly defined portions either simultaneously or sequentially by second or other molds.

As yet another alternative illustrated schematically in FIG. 3(b), the molding apparatus 30" may be in two parts $30''_1$ and $30''_2$ separately disposed to operate in tandem, the first apparatus part $30''_1$ having the first reference part 33 fixed a distance S from the first mold 31 and the second apparatus part $30''_2$ having a second reference part 34' defined by a mechanical abutment for the first component a fixed distance D from the second mold 32. After the first component has been molded in mold 31 in the first apparatus part, the bar is displaced to the second apparatus part and located by means of the first component 20 and second reference part 34' with the second portion 21 in the second mold 32, whereupon the second component is molded onto the bar.

The above described method is suited for molding components of any materials able to flow in a mold and to be secured with respect to the bar surface as a result of molding under pressure and solidifying. The invention has been found particularly suited to forming thrust collars, illustrated by components 25 and 26 in FIG. 2(b), which not only have to withstand lateral, that is, along-bar, forces without significant deformation or becoming detached from the bar, but also have to fit within small axial limits made available by the suspension. Such components may be required to have an axial length of the order of 5 mm just in order to fit between suspension parts, and there is clearly no room for efficiently disposing such components while installing the bar nor for error in positioning components of a pair prior to installing the bar due to reliance upon relationships between features of the bar. Such thrust collars may be molded from materials which are substantially rigid at ambient temperatures, displaying a tensile modulus in excess of 1 GPa and which, by being molded in intimate conformity with the bar surface, are able to withstand significant lateral forces with only relatively short axial interface, providing thrust collars whose radial widths are greater than their axial thicknesses.

Such strength of interface is enhanced, particularly for materials becoming rigid at ambient temperatures, by the nature of the surface grossly roughened by the shot peening process, that is, having small indentations related to the size of shot. Furthermore, even if the bar is painted at the first and second portions, the effects of surface roughness still have effect by way of the paint layer.

The surface protection, or paint, may be chosen in relation to the materials and/or molding details or vice versa. Typically a sway bar is given surface protection by coating with a paint powder which is thereafter fused at elevated temperature. Clearly it may be inappropriate to provide components of some thermoplastic materials before such a surface protection step.

Suitable materials for forming such collars may comprise epoxy components or thermoplastic materials such as polyphenylene sulphide or polybutylene teraphthalate, filled if desired with fibrous and/or particulate fillers as reinforcement.

Whereas the method according to the present invention provides for the location of components secured to the bar prior to offering the bar to a vehicle where it is not efficient or practicable to mount such components on the bar in assembling the bar with the vehicle, it may also be used in combination with conventional assembly techniques to enable more efficient usage of discrete components applied at assembly.

For example, a bar may be mounted with respect to a vehicle in the traditional manner by way of discrete suspension bush split to pass around the bar and shaped to be clamped to the bar and vehicle in mounting. Different vehicles, and even similar vehicles having different suspension characteristics, may require bars of different diameters to give appropriate torsional characteristics and, as a consequence, a corresponding range of split bushes differing only in respect of their inner diameters to cooperate with appropriate bars. By employing the method of the present invention it is possible to have a single split bush size that is able to fit bars of differing diameters by molding rigid collars of appropriate axial length at the portions of the bars where mounting is to be effected, which collars have a constant outside diameter chosen to provide the maximum possible bar diameter required by the bush and determined by the mold cavity, irrespective of the bar size below said maximum. Such molded collars effectively establish a constant bar diameter at the mounting points irrespective of the diameter of the bar as a whole and without effecting its torsional characteristics.

It is possible to require axially thin thrust collars as described above with reference to FIG. 2(b), to be disposed in a confined space adjacent such split bush mountings. It may thus be advantageous to mold components, one of which is illustrated in FIG. 4 at 40. Each component comprises a radially extensive, axially restricted collar portion 41 and integral therewith, an axially extending flange portion 42, thereby providing both a uniform bar surface for receiving a standardised split bush and an axially extensive interface between collar material and bar to increase its strength.

Other component forms may be produced which are rigid at ambient temperatures and components may be formed with elastomeric materials, rubber or a thermoplastic elastomer which may serve directly as molded suspension bushes when conjoined with chassis attachment points or brackets, where it is desired to control the positional relationship between first and second molded components and a molding style appropriate to the materials.

In respect of forming components of different materials and forms reference is made to the following Examples.

EXAMPLE 1A

An epoxy resin molding compound was injection molded directly onto a shot peened sway bar to form an annular washer-like thrust collar. The bar was pre-treated with a commercial de-greasing agent and molding was carried out with the molding tool and bar heated to 180° C., the barrel temperature of the machine at the injection nozzle being 80° C. The latter temperature was selected to achieve satisfactory flow of the epoxy compound which subsequently cured in situ on the bar.

The collar produced had good resistance to lateral thrust and was useful as a travel-limiting component in conjunction with a conventional rubber bush.

EXAMPLE 1B

A glass fibre reinforced, mineral filled poly-phenylene sulphide composition was injection molded onto a shot peened, de-greased, painted stabiliser bar, using the following machine conditions:

| | |
|---|---|
| Barrel temperature profile | 300° C., 300° C., 280° C., 260° C. |
| Tool temperature | 80° C. |
| Injection pressure | 16000 psi |
| Injection time | 15 seconds |
| Cooling time | 10 seconds |
| Holding pressure (cooling) | 7000 psi |

The products were molded collars which were tested for lateral loading strength as follows:

| Collar Size (mm) | | | |
|---|---|---|---|
| OD | Width | Bar Diameter (mm) | Load |
| 22 | 5 | 14 | 1.5 |
| 22 | 5 | 16 | 1.4 |
| 30 | 5 | 18 | 2.6 |

In each case the load was that developed prior to lateral slippage.

EXAMPLE 1C

A polybutylene terepthalate composition was injection molded onto shot peened and already-painted stabiliser bars, under the following conditions:

| | |
|---|---|
| Barrel temperature profile | 260° C., 260° C., 240° C., 220° C. |
| Mold temperature | 40° C. |
| Injection pressure | 17000 psi |
| Injection time | 15 seconds |
| Cooling time | 15 seconds |
| Holding pressure (cooling) | 7000 psi |

For comparison purposes, both shot peened unpainted and shot peened painted bars were used and tested for lateral loading strength, as before.

| Collar Size (mm) | | | | |
|---|---|---|---|---|
| OD | Width | Bar Diameter (mm) | State | Load (KN) |
| 25 | 5 | 15 | unpainted | 0.99 |
| 25 | 5 | 15 | painted | 0.94 |

EXAMPLE 2

In this case, the material of Example 1B was used to produce a component in the form of a collar with an integral, axially extending annular flange as illustrated in FIG. 4. The molding conditions were as in Example 1B, but with a clamping pressure of 10000 psi.

This configuration of collar was adopted to show that despite using bars of different diameters, a common collar size would give satisfactory results, thereby enabling its use with a single, split suspension bush size.

FIG. 4 is a cross-sectional size view through part of a sway bar 10″ comprising a bar form 10 onto which has been molded a component 40 which incorporates an axially thin collar part 41 and an integral, axially-extending annular flange 42. The surface of the bar form 10 was shot peened and painted prior to injection molding the collar with its axially-extending cylindrical flange 42. The same collar/flange was molded onto bars of different diameter and the lateral loading strength was determined, with the following results:

| Bar Diameter (mm) | Load (KN) |
|---|---|
| 12 | 2.9 |
| 14 | 1.8 |
| 16 | 1.6 |

These results were satisfactory.

EXAMPLE 3

A rubber bush was injection molded in situ on a stabiliser bar using a natural rubber composition consisting of:

Natural rubber 100 parts by weight

Carbon black 30 parts by weight

Curing agents 2.75 parts by weight

Anti-oxidants, processing aids 14 parts by weight

This was plasticised at 80° C. and injected into a tool heated to 170° C. where it was allowed to cure for three minutes. The molding produced was sufficiently well bonded to the bar and had sufficient mechanical stiffness to perform satisfactorily as a suspension bush.

EXAMPLE 4

A suspension bush was injection molded in situ on a stabiliser bar from a thermoplastic elastomer composition of the kind sold under the trade mark SANTOPRENE, grade 101-80, described as a dynamically vulcanised polypropylene/EPDM. Molding was carried out onto a previously shot peened and painted bar, using a barrel temperature of 180° C. with a cold molding tool. The injection pressure was 12000 psi and the holding pressure (cooling) was 6000 psi. The total cycle time was 30 seconds, comprising 10 seconds for injection and 20 seconds for cooling.

The thus-molded bush performed satisfactorily as a suspension bush.

We claim:

1. A method of manufacturing a vehicle sway bar comprising:

(i) forming a steel rod into a desired shape of bar, (ii) defining for said bar a first portion at which a first suspension component is to be molded onto the bar; a second portion spaced a predetermined distance along said bar from said first portion, at which a second suspension component is to be molded onto said bar; and a datum point separated from said first portion of said bar by a predetermined spacing, (iii) disposing said bar with respect to a molding apparatus, said apparatus having a mold adapted to receive and enclose one of said first and second portions of said bar, a first reference part separated from said mold by said predetermined spacing and a second reference part spaced from said first reference part by a distance equal to said predetermined distance between said first and second portions of said bar, with said datum point of said bar at said first reference part of the apparatus so that said first portion is within said mold, (iv) molding onto said first portion of said bar from rubber or plastics material a first suspension component, (v) thereafter disposing said bar with respect to the molding apparatus with said first suspension component at said second reference part so that said second portion of said bar is within said mold, and (vi) molding onto said second portion of said bar from rubber or plastics material a second suspension component.

2. A method as claimed in claim 1 comprising defining said predetermined distance between said second reference part and said mold with greater accuracy than said predetermined spacing between said datum point and said first portion of said bar.

3. A method as claimed in claim 1 comprising molding at least one of said components from a plastics material which is rigid at ambient temperatures.

4. A method as claimed in claim 3 comprising molding at least one of said first and second suspension components as an axial thrust collar having a radial width greater than its axial thickness.

5. A method as claimed in claim 1 comprising molding at least one of said first and second suspension components from a reinforced polyphenylene sulphide composition.

6. A method as claimed in claim 1 comprising, between said forming of said bar shape and molding said first and second suspension components thereonto, roughening a surface of said bar at least at said first and second portions by shot peening and painting said surface.

7. A method of manufacturing a vehicle sway bar comprising:

(i) forming a steel rod into a desired shape of bar, (ii) defining for said bar shape a first portion at which a first suspension component is to be molded onto said bar; a second portion spaced a predetermined distance along said bar from said first portion, at which a second suspension component is to be molded onto said bar, and a datum point separated from said first portion by a predetermined spacing, (iii) disposing said bar with respect to a molding apparatus, said apparatus having a first mold adapted to receive and enclose said first portion of said bar, a second mold adapted to receive and enclose said second portion of said bar, a first reference part separated from said first mold by said predetermined spacing, and a second reference part spaced from said first mold and spaced from said second mold by a distance equal to said predetermined distance between the first and second portions of said bar, with the datum point of said bar at said first reference part of the apparatus so that said first portion of said bar is within said first mold, (iv) molding onto said first portion of said bar from rubber or plastics material a first suspension component, (v) thereafter disposing said bar with respect to said molding apparatus with said first suspension component at said second reference part so that said second portion of said bar is within said second mold, and (vi) molding onto said second portion of said bar from rubber or plastics material a second suspension component.

8. A method as claimed in claim 7 comprising defining said predetermined distance between said second reference part and said second mold with greater accuracy than said predetermined spacing between said datum point and said first portion of said bar.

9. A method as claimed in claim 7 comprising molding at least one of said first and second suspension components frown a plastics material which is rigid at ambient temperatures.

10. A method as claimed in claim 9 comprising molding at least one of said first and second suspension components as an axial thrust collar having a radial width greater than its axial thickness.

11. A method as claimed in claim 7 comprising molding at least one of said first and second suspension components from a reinforced polyphenylene sulphide composition.

12. A method as claimed in claim 7 comprising, between said forming of said bar shape and molding said first and second components thereonto, roughening a surface of said bar at least at said first and second portions by shot peening and painting said surface.

13. Apparatus for manufacturing a vehicle sway bar comprising bending apparatus, operable to bend a steel bar into a desired sway bar form, and molding apparatus having a mold sized and shaped to receive and enclose a continuous short portion of said bar form, a first reference part separated from said mold by a predetermined spacing and a second reference part spaced from said first reference part by a predetermined distance, said mold and said first and second reference parts being arranged in operation so as to (a) receive said bar form with a datum point thereof disposed with respect to said first reference part and with a first portion of said bar form, spaced from the datum point by said predetermined spacing, in said mold; and after a first suspension component of rubber or plastics materials is molded onto said first portion of the bar, (b) receive said bar form with said first suspension component at said second reference part and a second portion of said bar, spaced from said first portion by said predetermined distance, in said mold, thereby permitting a second suspension component of rubber or plastics material to be molded onto said second portion of said bar.

14. Apparatus for manufacturing a vehicle sway bar comprising bending apparatus, operable to bend a steel bar into a desired sway bar form, and molding apparatus having first and second molds, said molds being adapted to receive and enclose respectively differently shaped continuous short portions of said bar form, a first reference part separated from said first mold by a predetermined spacing and a second reference part spaced from said first mold and spaced from said second mold by a predetermined distance, said first and second molds and said first and second reference parts being arranged in operation so as to (a) receive said bar form with a datum point thereof disposed with respect to said first reference part and with a first portion of said bar form, spaced from the datum point by said predetermined spacing, in said first mold; and after a first suspension component of rubber or plastics materials is molded onto said first portion of the bar, (b) receive said bar form with said first suspension component at said second reference part and a second portion of said bar, spaced from said first portion by said predetermined distance, in said second mold, thereby permitting a second suspension component of rubber or plastics material to be molded onto the second portion of said bar.

* * * * *